3,496,363
ELECTRONIC DEVICE FOR SEARCHING FOR AND TRACKING A RADIANT OBJECT HAVING A SELECTIVELY CONTROLLABLE IMAGING SYSTEM
Martin Rome, Princeton, N.J., assignor to Electro-Mechanical Research, Inc., Princeton, N.J., a corporation of Connecticut
Filed May 16, 1967, Ser. No. 638,791
Int. Cl. H01j 29/30, 29/62, 31/50
U.S. Cl. 250—203                   10 Claims

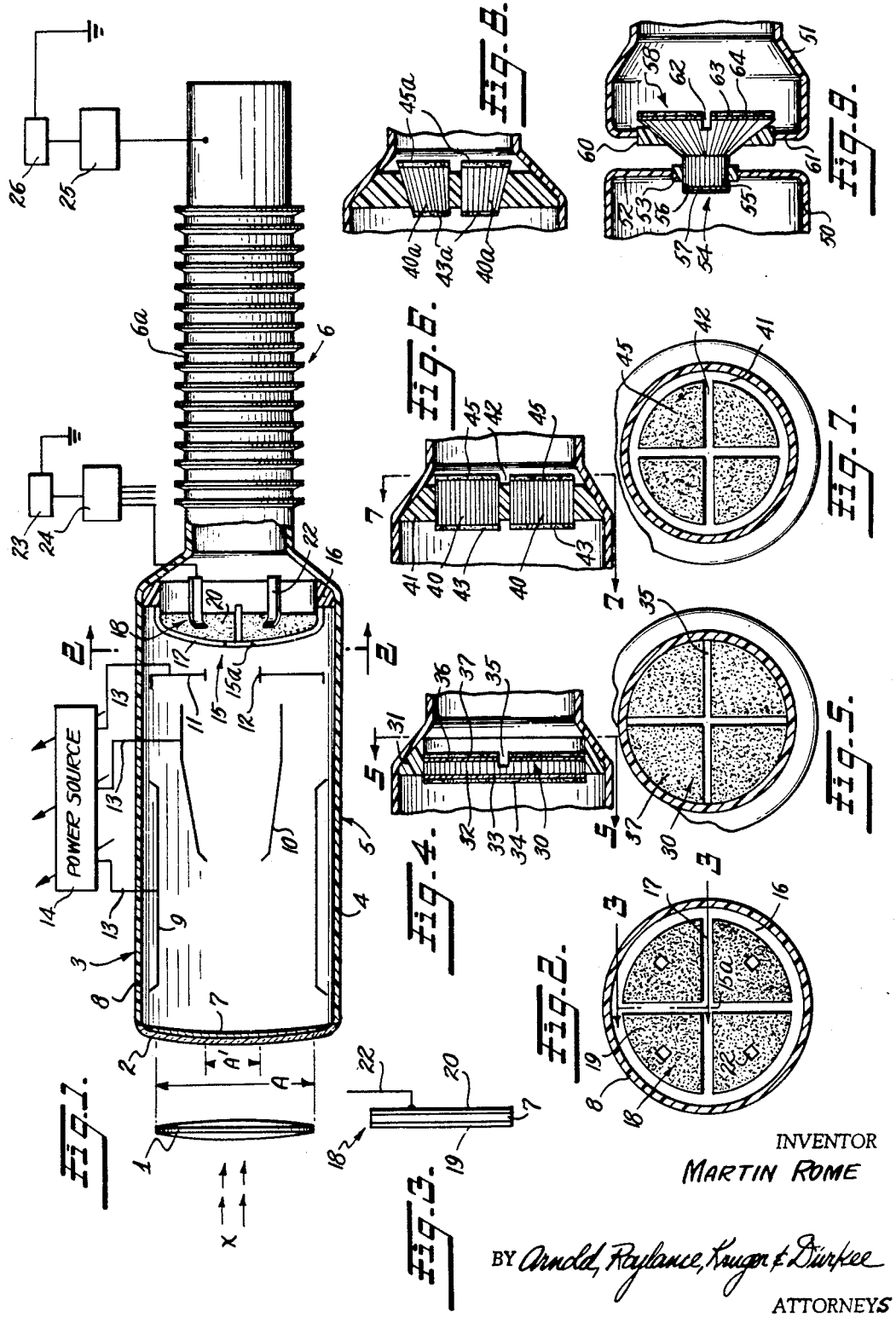

ABSTRACT OF THE DISCLOSURE

An electronic device for searching for and tracking a radiant object, such as a star. Light, or other radiant energy, from the object is focussed onto a primary photocathode by an optical lens system and the primary photocathode provides an electron beam emanating from the spot on which the radiant energy is focussed. The electron beam is focussed by a controllable electron lens system onto an anode phosphor which provides a radiant image corresponding to the image focussed onto the primary photocathode. Radiant energy from the radiant image provided by the anode phosphor is supplied to a quadrant multiplier phototube which operates to produce output signals indicative of the relative position and intensity of the radiant object. The electron lens system is operated to image the entire primary photocathode area on the active quadrant area of the phototube during searching to locate the desired radiant object, and is then operated to image only a smaller portion of the primary photocathode area during tracking of the object, yielding the same results as if the optical field of view had been reduced.

---

This invention relates to devices for searching for and tracking a radiant object, such as a star.

Particularly in the fields of astronomy and celestial navigation, it is often desirable to search to locate a particular star and then track or "lock on" the star so located. Prior-art workers attempting to provide devices for accomplishing such search and track operations have encountered difficulties arising from the need for a wide field of view during the search operation and a narrow field of view during the tracking operation. One approach to this problem has involved the use of a relatively complex optical system of the variable focal length or "zoom" type to provide the initially wide, then narrow fields of view. Though such an approach provides an operative device, the fact that the variable focal length optical system requires mechanical movement of the lens elements has severely limited system reliability, and devices constructed to carry out this approach have not proved fully satisfactory.

Accordingly, a general object of this invention is to provide an improved device capable of searching for and then tracking a radiant object, the device avoiding the use of variable focal length optical systems and like complex and cumbersome components.

Another object is to devise an all-electronic search and track tube.

A further object is to provide a device of the type described which provides the same results as if a variable focal length optical system were employed but which eliminates the need for mechanically movable elements.

Yet another object is to devise a search and track device embodying a quadrant multiplier phototube operated at maximum null precision during both the searching mode and the tracking mode.

The invention provides a search and track tube including an imaging section and a multiplier phototube section. The imaging section comprises a primary photocathode, onto which light or other radiant energy is focussed by an optical lens system; an anode phosphor; and a controllable electron lens system interposed between the primary photocathode and the anode. The imaging section is so coupled to the phototube section that the phototube provides output signals representative of the position and intensity of the radiant images provided by the anode phosphor of the imaging section, the output signals therefore being representative of the position and intensity of the radiant object supplying light or other radiant energy to the primary photocathode. The electron lens system is operated to cause the entire area of the primary photocathode to be imaged on the active quadrant area of the phototube during operation in the searching mode, and to cause only a smaller central portion of the primary photocathode to be imaged on the active quadrant area of the phototube during operation in the tracking mode, so that the same result is achieved as if the optical field of view had been narrowed for the tracking mode. The selected area of the primary photocathode, whether it be the entire photocathode area or the smaller central portion, is focussed on the entire anode phosphor area, so that the full precision inherent in the quadrant phototube principle is attained for both searching and tracking.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a semi-diagrammatic view, partly in longitudinal section and partly in side elevation, of a search and track device according to one embodiment of the invention and having both an imaging section and a phototube section;

FIG. 2 is a transverse sectional view taken on line 2—2, FIG. 1;

FIG. 3 is an enlarged elevational view taken as indicated by line 3—3, FIG. 2;

FIG. 4 is a fragmentary semi-diagrammatic view illustrating a portion of a search and track tube in accordance with another embodiment of the invention;

FIG. 5 is a transverse sectional view taken on line 5—5, FIG. 4,

FIG. 6 is a fragmentary semi-diagrammatic view illustrating a portion of a search and track tube according to a further embodiment of the invention;

FIG. 7 is a transverse sectional view taken on line 7—7, FIG. 6;

FIG. 8 is a fragmentary semi-diagrammatic view illustrating a modified form of the device shown in FIG. 6; and FIG. 9 is a fragmentary semi-diagrammatic view showing a portion of a search and track tube in accordance with a still further embodiment of the invention.

Referring now to FIG. 1, the embodiment of the invention there illustrated comprises a conventional optical lens system 1 disposed to focus radiant energy onto the transparent face plate 2 of a search and track tube indicated generally at 3. Tube 3 comprises a single envelope 4 made of glass or other suitable electrically non-conductive material and conventionally evacuated and sealed. The tube can be considered as comprising an imaging section 5 and a multiplier phototube section 6.

On its inner surface, face plate 2 carries a primary photocathode 7 which can be in the form of a conventionally formed coating or layer of any suitable photoemissive material. Primary photocathode 7 and face plate 2 are substantially coextensive and circular, and the portion 8 of envelope 4 adjacent face plate 2 extends cylindrically with the same diameter as the face plate. Envelope portion 8 contains a controllable electron lens system comprising a cylindrical electrode element 9, a main anode element 10, designed on the "concentric spheres" principle, and a transversely arranged electrode element 11 having a central aperture 12, elements 9–11 all being concentric with the longitudinal axis of the tube. Elements 9–11 are electrically conductive and are connected via suitable conductors 13 to a controllable power source 14. Though any suitable electron lens system can be employed, the lens system is advantageously of the electrostatic type, such as that described in "An Experimental Image-Intensifier Tube with Electrostatic 'Zoom' Optics," A. W. Woodhead et al., Philips Technical Review, vol. 25, No. 4, Mar. 24, 1964.

Phototube section 6 can be constructed in accordance with U.S. Patent 3,294,975, issued Dec. 27, 1966, to Horst G. Fleck, modified to include an anode phosphor onto which electrons from primary photocathode 7 are focussed by the electron lens system. At the junction between imaging section 5 and phototube section 6, a radially slotted window 15 extends transversely across the envelope 4, the window being supported by a ring 16 of suitable insulating material. Window 15 is of transparent, electrically non-conductive material, such as glass and, because of the radial slots 17, is divided into four quadrants or segments 18 (FIG. 2). Slots 17 extend from the center of the window to ring 16, so that there is a central aperture 15a, in the window which is formed by the intersection of the slots 17, and all of the quadrants 18 are physically and electrically isolated from each other.

As best understood from a comparison of FIGS. 1–3, the surface of each window segment 18 which faces toward face plate 2 bears a coextensive layer 19 of a suitable phosphorescent material capable of converting an electron beam into a corresponding radiant image. Layers 19 can be a conventional aluminized phosphor, for example.

The opposite surface of each segment 18 bears a layer 20 of any suitable photoemissive material, and these four layers constitute segments of the photocathode of the phototube section 6. Photocathode segments 20 are each connected via a sequential switch 25 to any suitable circuit 23 via a sequential switching device 24.

Phototube section 6 is completed by a conventional dynode portion 6a, the output of the dynode portion being connected via a sequential switch 25 to any suitable output equipment 26, switches 24 and 25 being synchronized and equipment 26 being operative to record or visually display the output signals developed by phototube section 6.

Controllable power source 14 comprises means by which the electron lens system comprising elements 9–11 can be controlled selectively to pass electrons emitted by a larger area of the primary photocathode 7 (such as the entire circular area A thereof) or only from a smaller area (such as the central circular area A') located within the larger area. In both cases, the electron lens system is operated to focus the electrons from the entire selected area of primary photocathode 7 onto the same preselected area of the anode made up of phosphor segments 19. Thus, the electron flow passed by the electron lens system can be focused on the entire anode area constituted by phosphor segments 19, both when the electron flow is derived from primary photocathode area A and when it is derived from primary photocathode area A'.

Assuming that a beam of radiant energy is focussed by optical lens system 1 onto primary photocathode 7 within the area selected by operation of the electron lens system, the electrons accordingly emitted by the primary photocathode will be focussed onto one or more of the anode phosphor segments 19, the particular segments involved, the point of focus on the segments, and the relative size of the focussed "image" on the segments, depending upon the particular point on primary photocathode 7 upon which the beam of radiant energy is focussed and upon the manner in which the electron lens system is controlled. A radiant image, corresponding to the image focussed onto the primary photocathode by the optical lens system, is accordingly produced by the phosphor segments 19 involved. Window 15 being transparent, radiant energy from the image provided by the phosphor segments 19 is transmitted directly to the corresponding ones of the photocathode segments 20. The particular photocathode segments are accordingly excited to provide electrons in such fashion as to cause the phototube to generate an output signal indicative of the intensity of the radiant image provided by the phosphor segments 19. Sequential switches 24 and 25 can be operated at such a speed that the output signals derived from the various photocathode segments will appear to be simultaneously recorded or displayed.

When an electron beam from primary photocathode 7 is precisely centered on window 15, an equal amount of the electron beams impinges on each of the four phosphor segments 19 so that there is no appreciable difference in the output signals derived from photocathode segments 20, thereby obtaining a null condition which is detectable at output equipment 26.

The entire device illustrated in FIG. 1 can be supported conventionally by a gimbal system (not shown) in such fashion that the position of the device, relative to its support, can be adjusted to direct the optical lens system 1 toward the particular area of the heavens to be searched. To operate the device in the searching mode, power source 14 is adjusted to apply to the electron lens elements 9–11 electrostatic potentials such that the image field at the anode constituted by phosphor segments 19 corresponds to the entire area A of primary photocathode 7.

Since the location of a so-called "bright star" such as star X (FIG. 1), which is surrounded by relatively dark stars in comparison to star X, is generally known from celestial navigational charts and tables, the position of the device is adjusted so that the light from star X is focussed onto primary photocathode 7. A radiant image corresponding in position and intensity to star X will be provided by the appropriate ones of phosphor segments 19, and the corresponding ones of photo cathode segments will be excited to cause phototube section 6 to produce output signals dependent upon the position and intensity of star X. The output signals can be observed and compared at or by output equipment 26 to indicate that star X is in the search field of view.

When the output signals at output equipment 26 indicate that star X is in the search field of view, the device is adjusted in position to center the corresponding electron beam produced by primary photocathode 7 onto central aperture 15a of window 15, so that a null condition is attained, that is there is no appreciable difference in the output signals from photocathode segments 20. The device is now operated in the tracking or "lock-on" mode, power source 14 being adjusted to so change the electrostatic potentials applied to elements 9–11 of the electron lens system that electron beams from only the smaller central area A' of the primary photocathode 7 can pass to window 15. In this connection, it will be understood that directional adjustment of the device to attain the null condition caused the light from star X to be focussed at least approximately on the center of face plate 2, so as to be within the smaller area A'. So long as the device remains thus "locked on" star X, there will be no appreciable difference in the output signals developed by the photocathode segments of the four quadrants of phototube section 6. Whenever the optical axis of the lens system 1 becomes significantly displaced, the point of focus of the light from star X on primary photocathode 7 will move off center, so that corresponding radiant images will then be provided by one or more of the phosphor segments 19. This causes a difference in the output signals from the phototube to occur again, indicating that the device must be re-oriented, as by making the proper flight adjustment in the case of a space vehicle or the like.

Though the operation of the device has been described as a series of incremental steps, it will be apparent to those skilled in the art that conventional electronic equipment and servo-mechanisms can be employed to operate the device rapidly and automatically for searching and tracking.

It will be understood that, though the embodiment of the invention illustrated in FIGS. 1–3 employs a multiplier phototube having a photocathode composed of four wedge-shaped segments separated by the narrow slots 17, the number and shape of the photocathode segments is a matter of design depending upon such factors as the degree of sensitivity desired and is not critical to the invention.

FIGS. 4 and 5 illustrate another manner in which the imaging section of the search and track tube can be coupled to the phototube section. Here, a fiber optic plate indicated generally at 30 is supported by an insulating ring 31 and extends transversely across the interior of the envelope of the tube at the junction between the imaging and phototube sections. In the embodiment illustrated, plate 30 includes a flat major face directed toward the imaging section and this face carries a continuous very thin transparent layer 33 of glass or the like. A continuous layer of phosphorescent material 34 is formed on the exposed surface of layer 33 and constitutes the anode of the imaging section. The opposite major face of body 32 is grooved radially as indicated at 35, in a pattern to define triangular mutually independent face segments. Each such face segment carries a continuous very thin transparent layer 36 of glass or the like. Layers 36 are in turn coated with a suitable photoemissive material 37 with each photoemissive layer 37 constituting a segment of the photocathode of the phototube section. Grooves 35 are of sufficient depth and width to physically separate the photoemissive layers 37 to prevent electrical leakage therebetween. A radiant image established on any portion of the layer of phosphorescent material 34 which is opposed to one of the photoemissive layers 37 will supply radiant energy to that photoemissive layer via the optical fibers of body 32 disposed at the image, and the radiant image will therefore be reproduced by that photoemissive layer 37 as a corresponding electron image. It will be understood that layers 33 and 36 are not required and that the phosphorescent and photoemissive material can be coated directly onto plate 30.

Alternatively, instead of employing the grooves 35, the mutually independent photocathode segments can be constituted by physically separated fiber optic bodies each having a transverse cross-sectional shaped corresponding to the shape desired for the photocathode segment. Thus as seen in FIGS. 6 and 7, four individual fiber optic bodies 40 are supported by an insulating ring 41, each body 40 being of such triangular transverse cross-section that the end faces of the bodies have the same plan configuration as the segments 18 of window 15 in the embodiment of FIGS. 1–3, and are separated by spaces 42 (similar to grooves 17). The end faces of the bodies 40 directed toward the imaging section are each coated with a layer 43 of phosphorescent material, the layers 43 of phosphorescent material making up the anode of the imaging section of the tube. The opposite end faces of the bodies 40 are each coated with a layer 45 of photoemissive material, the photoemissive layers 45 constituting the photocathode of the phototube section.

When the imaging section and the phototube sections are coupled by a fiber optic device, each optical fiber is effective to conduct radiant energy from a unit portion of the radiant image produced by the anode phosphor to the photocathode segment at the opposite end of the fiber, and radiant energy from the total image is thus applied to the photocathode via a plurality of the optical fibers. In effect, the fiber optic device accomplishes transfer of the radiant image to the photocathode surface without enlargement of the image and substantially without "crosstalk" between the photocathode segments.

Whether the segmental photocathode of the phototube section is provided by grooving a single fiber optic body, as in FIGS. 4 and 5, or by employing mutually independent fiber optic bodies, as in FIGS. 6 and 7, it is advantageous to have the anode phosphor area of the imaging section smaller than the photocathode area of the phototube section, with the fiber optic structure tapering accordingly, as illustrated in FIG. 8. Here, the independent fiber optic bodies 40a, corresponding to bodies 40 in the embodiment of FIGS. 5 and 6 have small triangular end faces directed toward the phototube section, so that the photoemissive layers 45a are similar to but substantially larger than the phosphorescent layers 43a. To accommodate this change in end face size, the optical fibers employed for bodies 40a taper correspondingly and are disposed with their smaller diameter ends at the end of the body which is directed toward the imaging section and their larger diameter ends of the end of the body which is directed toward the phototube section. This structure has a distinct advantage in minimizing the effective width of the spaces between the segments of the photocathode constituted by the photoemissive layers 45a. In this connection, it will be understood that, because of practical considerations, the actual spacing between the photocathode segments cannot be less than on the order of several thousandths of an inch. But, when tapered fiber optic bodies are employed, and the ends thereof directed toward the phototube are, for example, three times larger than the ends directed toward the imaging section, the effective spacing between the photocathode segments constituted by layers 45a is three times smaller, in comparison to the total photocathode area, than is the spacing between the anode phosphor layers 43a. Effective reduction of the segments separation provides enhanced null precision. The same result can be achieved with the single fiber optic body, as in the embodiment shown in FIG. 9.

In the embodiment of FIG. 9, separate envelopes 50 and 51 are employed to enclose the imaging and phototube sections, respectively. Envelope 50 has a transverse annular end wall 52. An insulating support ring 53 is secured in fluid-tight relation to the inner periphery of end wall 52 and embraces and supports a fiber optic plate 54 comprising a flat fiber optic disc 55 the optical fibers of which extend parallel to the longitudinal central axis of the tube. The flat major face of disc 55 which is directed toward the face plate of the tube carries a very thin transparent glass layer 56. The exposed surface of layer 56 has adhered thereto a continuous layer 57 of a suitable phosphorescent material, the layer 57 constituting the anode of the imaging section. The combination of fiber optic plate 54, support ring 53 and envelope end wall 52 is such as to maintain the fluid-tight sealed relationship required to keep envelope 50 evacuated.

The remaining major surface of fiber optic disc 55 is joined to the smaller end surface of a frusto-conical fiber optic body 58. Body 58 is embraced by and secured in fluid-tight relation to a support ring 60 which is in turn secured and sealed to the inner periphery of the transverse annular end wall 61 of envelope 51. The larger end surface of body 58 is grooved radially as indicated at 62, so as to be divided into four identical coplanar surface areas. Each such surface area bears a thin transparent layer 63 of glass or the like which in turn is coated with a layer 64 of photoemissive material, the eight layers 64 constituting the photocathode of the phototube section.

The embodiment of the invention illustrated in FIG. 9 has the advantage that fabrication of the tube is less complex and difficult than when only a single envelope is employed.

All of the embodiments of the invention described have the advantage that electron lens system of the imaging section can be controlled to provide an image at the photocathode of the phototube which is of the optimum size for obtaining maximum nulling precision.

While particularly advantageous embodiments of the invention have been chosen for illustrative purposes, it will be understood that various changes and modifications can be made therein without departing from the scope of the invention as defined in the appended claims.

What is claimed is:

1. In a device for searching for and tracking a radiant object, such as a star, the combination of photocathode means for producing electron flow in response to radiant energy focussed thereon means; for converting said electron flow into a corresponding radiant image; phototube means responsive to said radiant image for producing an output signal corresponding to said radiant image and therefore to the radiant energy focussed on said photocathode means said phototube means having a plurality of mutually independent photocathode sections; electron lens means operatively arranged relative to said photocathode means for focussing electron flow from said photocathode means onto said converting means, said converting means having a plurality of mutually independent anode phosphor sections each operatively coupled to a different one of said photocathode sections of said phototube means; and means whereby said electron lens means can be controlled to focus the electron flow from a relatively large area of said photocathode means onto said converting means, when the device is operated to search for a radiant object, and to focus the electron flow from a smaller area of said photocathode means lying within said larger area when the device is operated to track a radiant object.

2. In a device for searching for and tracking a radiant object, such as a star, the combination of imaging means including primary photocathode means having a given surface area operative to produce electron flow corresponding to radiant energy focussed thereon, means disposed to receive such electron flow and operative to convert the same into corresponding radiant images, electron lens means operatively arranged with respect to said primary photocathode means and said converting means, and means whereby said electron lens means can be controlled to select the area of said primary photocathode means from which electrons are permitted to pass to said converting means; and multiplier phototube means comprising photocathode means operatively arranged to respond to said radiant images and produce electron images corresponding thereto, said photocathode means having a plurality of mutually independent photocathode sections, said phototube means also comprising means for converting said electron images into output signals indicative of the intensity of said radiant images, said phototube converting means having a plurality of individual anode phosphor sections each arranged to supply radiant energy to a different one of said independent photocathode sections; control of said electron lens means to permit passage of electrons from a larger area of said primary photocathode means to said converting means allowing the device to be employed with a wide field of view to search for and locate a radiant object, and control of said electron lens means to permit passage of electrons from only a smaller area of said primary photocathode means to said converting means allowing the device to be used with a smaller field of view to track the radiant object.

3. A device according to claim 2, wherein said fiber optic means comprises a fiber optic body having a first end directed toward said primary photocathode means of said imaging section and a second end directed toward said phototube means, said converting means comprises a phosphor anode layer supported by said first end of said fiber optic body, said second end being grooved to divide the same into a plurality of mutually independent surfaces, and said photocathode sections of said phototube means each include a layer of photoemissive material on one of said mutually independent surfaces.

4. A device according to claim 2, wherein said fiber optic means comprises a plurality of mutually independent fiber optic bodies, said converting means comprises a plurality of anode phosphor layers each carried by one end of a different one of said fiber optic bodies, and said independent photocathode sections of said phototube means are layers of photoemissive material each carried by the other end of a different one of said fiber optic bodies, like ends of said fiber optic bodies being mutually coplanar.

5. A device according to claim 2, wherein said fiber optic means comprises a tapered fiber optic body having a smaller end and a larger end and comprising a plurality of tapered optical fibers each disposed with its smaller diameter end at said smaller end of said body, said smaller end of said body being directed toward said primary photocathode means of said imaging section and said larger end of said body being directed toward said phototube means; said converting means comprising an anode phosphor layer carried by said smaller end of said body; said larger end of said body being radially grooved to divide the surface of said larger end into a plurality of mutually independent generally triangular surface portions; each of said photocathode sections of said phototube means being carried by a different one of said generally triangular surface portions.

6. A device according to claim 3, wherein said second end is substantially larger than said first end and the optical fibers of said fiber optic body are tapered and arranged with their smaller ends at said first end of said body.

7. A device according to claim 4, wherein said fiber optic bodies are identical, have generally triangular transverse cross-sections, and are arranged in a circular series in such fashion that the cross-sectional triangle of each of said bodies approximately constitutes a segment of the circle of said series.

8. A device according to claim 7, wherein said fiber optic bodies are tapered, said one end of each of said bodies being smaller and said other end of each of said bodies being larger, whereby the area covered by each of said layers of photoemissive material is substantially larger than the area covered by each of said anode phosphor layers.

9. In a device for searching for and tracking a radiant object, such as a star, the combination of imaging means including primary photocathode means having a given surface area operative to produce electron flow corresponding to radiant energy focussed thereon, means disposed to receive such electron flow and operative to convert the same into corresponding radiant images, electron lens means operatively arranged with respect to said primary photocathode means and said converting means, and means whereby said electron lens means can be controlled to select the area of said primary photocathode means from which electrons are permitted to pass to said converting means, and multiplier phototube means comprising photocathode means operatively arranged to respond to said radiant images and produce electron images corresponding thereto, said phototube means also comprising means for changing said electron images into output signals indicative of the intensity of said radiant images, said imaging means and said phototube means are contained in separate envelopes, and means extending between said envelopes for supplying radiant energy from said converting means to said photocathode means of said phototube means, said radiant energy supplying means having a first fiber optic body with one end disposed within the envelope containing said imaging means and its other end disposed outside of said enevelope, said converting means having an anode phosphor layer carried by said one end of said first fiber optic body, said means for supplying radiant energy also comprising a second fiber optic body having one end disposed within the envelope containing said phototube means and its other end disposed outside of said envelope, said photocathode means of said phototube comprising photoemissive means carried by said one end of said second fiber optic body, said other ends of said first and second fiber optic bodies being mechanically and optically coupled together, said second fiber optic body being tapered with said one end thereof being substantially larger than said other end thereof, said second fiber optic body comprising a plurality of tapered optical fibers each disposed with its smaller diameter end at said other end of said second fiber optic body, and said other end of said second fiber optic body presenting an uninterrupted surface, said one end of said second fiber optic body is radially grooved to divide the same into a plurality of mutually independent substantially triangular surface portions, and said photocathode means of said phototube means comprises a plurality of photoemissive layers each carried by a different one of said surface portions; control of said electron lens means to permit passage of electrons from a larger area of said primary photocathode means to said converting means allowing the device to be employed with a wide field of view to search for and locate a radiant object, and control of said electron lens means to permit passage of electrons from only a smaller area of said primary photocathode means to said converting means allowing the device to be used with a smaller field of view to track the radiant object.

10. In a device for searching for and tracking a radiant object, such as a star, the combination of imaging means including primary photocathode menas having a given surface area operative to produce electron flow corresponding to radiant energy focussed thereon, means disposed to receive such electron flow and operative to convert the same into corresponding radiant images, electron lens means operatively arranged with respect to said primary photocathode means and said converting means, and means whereby said electron lens means can be controlled to select the area of said primary photocathode means from which electrons are permitted to pass to said converting means; and multiplier phototube means comprising photocathode means operatively arranged to respond to said radiant images and produce electron images corresponding thereto, said phototube means also comprising means for changing said electron images into output signals indicative of the intensity of said radiant images; control of said electron lens means to permit passage of electrons from a larger area of said primary photocathode means to said converting means allowing the device to be employed with a wide field of view to search for and locate a radiant object, and control of said electron lens means to permit passage of electrons from only a smaller area of said primary photocathode means to said converting means allowing the device to be used with a smaller field of view to track the radiant object; and window means having one major surface directed toward said primary photocathode means of said imaging means and the other major surface directed toward said photocathode means of said phototube means, said converting means of said imaging means comprising a plurality of mutually independent anode phosphor sections carried by said one major surface of said window means, and said photocathode means of said phototube means comprising a plurality of mutually independent photocathode sections, said anode phosphor sections each being opposed to a different one of said photocathode sections.

References Cited

UNITED STATES PATENTS

| | | | |
|---|---|---|---|
| 2,431,510 | 11/1947 | Salinger | 250—207 |
| 3,058,021 | 10/1962 | Dunn | 313—65 |
| 3,260,849 | 7/1966 | Polye | 250—227 X |
| 3,274,416 | 9/1966 | Rotow | 250—213 X |
| 3,290,505 | 12/1966 | Stavis | 250—203 |
| 3,294,975 | 12/1966 | Fleck | 313—96 X |
| 3,321,658 | 5/1967 | Courtney et al. | 313—65 X |
| 3,383,514 | 5/1968 | Dolon | 313—96 X |
| 3,286,114 | 11/1966 | Schlesinger | 313—83 |

JAMES W. LAWRENCE, Primary Examiner

E. R. LA ROCHE, Assistant Examiner

U.S. Cl. X.R.

250—213, 227; 313—65, 83, 92, 96